United States Patent
Ryu et al.

(10) Patent No.: US 9,976,577 B2
(45) Date of Patent: May 22, 2018

(54) INTEGRATED HYDRAULIC ROTARY ACTUATOR

(71) Applicant: KNR SYSTEMS INC., Yongin (KR)

(72) Inventors: Sung Moo Ryu, Seongnam (KR); Ki Tak Ahn, Osan (KR); Gyu Young Lee, Osan (KR)

(73) Assignee: KNR SYSTEMS INC., Yongin (KR)

( * ) Notice: Subject to any disclaimer, the term of this patent is extended or adjusted under 35 U.S.C. 154(b) by 457 days.

(21) Appl. No.: 14/700,579

(22) Filed: Apr. 30, 2015

(65) Prior Publication Data

US 2016/0290371 A1    Oct. 6, 2016

(30) Foreign Application Priority Data

Mar. 31, 2015 (KR) .................. 10-2015-0045237

(51) Int. Cl.
*F15B 15/12* (2006.01)
*B25J 9/14* (2006.01)
*B25J 13/08* (2006.01)

(52) U.S. Cl.
CPC ............... *F15B 15/12* (2013.01); *B25J 9/146* (2013.01); *B25J 13/087* (2013.01); *B25J 9/148* (2013.01); *F15B 15/125* (2013.01); *Y10S 901/09* (2013.01)

(58) Field of Classification Search
CPC ......... F15B 15/12; F15B 15/125; B25J 9/146; B25J 9/148
See application file for complete search history.

(56) References Cited

U.S. PATENT DOCUMENTS

| | | | | |
|---|---|---|---|---|
| 4,784,047 A | * | 11/1988 | Stoll ........................ | F15B 15/12 277/345 |
| 5,622,096 A | * | 4/1997 | Granberg ............. | G01D 11/245 92/120 |
| 5,809,955 A | * | 9/1998 | Murata ................... | F01L 1/356 123/90.17 |

FOREIGN PATENT DOCUMENTS

| | | | | |
|---|---|---|---|---|
| DE | 202006001597 U1 | * | 4/2006 | ............. F15B 15/12 |
| DE | 102013012774 A1 | * | 2/2015 | ............. F15B 15/12 |
| EP | 0479399 A2 | * | 4/1992 | ............... F15B 9/09 |
| JP | 2012-147541 A | | 8/2012 | |
| KR | 10-0268323 B1 | | 10/2000 | |
| KR | 10-0956849 B1 | | 5/2010 | |

OTHER PUBLICATIONS

EP 0479399 A2 machine translation to English from espacenet. 1992.*
DE 202006001597 U1 machine translation to English from espacenet. 2006.*
DE 102013012774 A1 machine translation to English from espacenet. 2015.*

* cited by examiner

*Primary Examiner* — Nathaniel Wiehe
*Assistant Examiner* — Michael Quandt

(57) ABSTRACT

In the integrated hydraulic rotary actuator according to the present invention, a valve, a sensor, a controller, and a driving unit for controlling the rotary actuator are integrated, so wires connecting them are not exposed to the outside. Accordingly, it is possible to prevent damage due to interference in operation and maintenance is easy. Further, since it is integrated, including a controller, when the actuator according to the present invention is used, connecting with other parts is easy and interference can be reduced. Therefore, it is easy to design and manufacture a resultant product.

19 Claims, 7 Drawing Sheets

INTEGRATED HYDRAULIC ROTARY ACTUATOR

CROSS-REFERENCE TO RELATED APPLICATION

This application claims the benefit of priority of Korean Patent application No. 10-2015-0045237, filed on Mar. 31, 2015, all of which are incorporated by reference in their entirety herein.

BACKGROUND OF THE INVENTION

Field of the Invention

The present invention relates to an integrated hydraulic rotary actuator and, more particularly, to a hydraulic rotary actuator in which a rotary actuator, a valve, a sensor, and a controller are integrated.

Related Art

Actuators based on hydraulic pressure are characterized in that they are small and can be precisely controlled and they have larger output-to-size than those of actuators based on a motor. In particular, rotary actuators that are rotated and linear actuators that are linearly operated are used for developing various robots such as a dog-horse robot, a wearable robot, a heavy robot arm, and, recently, an underwater manipulator capable of carrying out work under the deep sea that people have difficulty in doing.

Such a hydraulic rotary actuator has been disclosed in Korean Patent No. 0956849, titled "Rotary Actuator and Rotary Actuator Type Joint Structure", by the applicants.

However, in the hydraulic rotary actuators of the related art, a sensor, a valve, and a controller for control are separated and several signal lines for connecting them are outside the actuators. Accordingly, there may be caused some problems such as loosening of bolts at joints due to vibration, interference between the parts and the signal lines in operation, and a short circuit of the signal lines due to the interference. Further, those problems need to be considered in design of robots to use the actuators, so the design is complicated and it is not easy to maintain the robots while using them.

SUMMARY OF THE INVENTION

The present invention provides an integrated hydraulic rotary actuator solving the problems in the related art such as difficulty in designing due to a complicated configuration of an actuator, loosening of bolts due to vibration and interference and a short circuit of signal lines in operation.

In an aspect, an integrated hydraulic rotary actuator includes: a stator that has a cavity therein; a rotor that is inserted in the stator and defines a plurality of cavities for receiving hydraulic oil, using its outer side in cooperation with the stator; a valve that is disposed at a side of the stator and rotates the rotor by changing the direction of the hydraulic oil supplied to the cavities; at least one sensor unit that measures the state of the hydraulic oil in the cavities or the state of the rotor; a controller that is disposed at a side of the stator and generates control input for controlling the rotor on the basis of a reference value inputted from the outside and a value measured by the sensor unit; and wires that electrically connect the controller with the valve and the controller with the sensor unit and are disposed inside the stator not to exposed to the outside.

The stator may have at least one wire channel in which at least one of the wires is disposed.

The wire channel may be formed at a predetermined distance from an inner surface of the stator not to be exposed to the cavities for receiving the hydraulic oil.

The sensor unit may include a plurality of pressure sensors measuring pressure in the cavities receiving the hydraulic oil, respectively, the stator may include: a plurality of pressure sensor grooves where the pressure sensors are disposed; and a plurality of pressure measurement channels connecting the pressure sensor grooves and the cavities, and the pressure sensors are disposed in the pressure sensor grooves, respectively.

The sensor unit may include a position sensor measuring a rotational position of the rotor, and the position sensor may be disposed axially on the outer side of the stator, close to the rotor, and the integrated hydraulic actuator may further include a position sensor cap axially combined with the stator from the outside so that the position sensor is not exposed to the outside.

The controller may be disposed axially on the outer side of the stator, close to the rotor and may be positioned between the position sensor cap and the stator not to be exposed to the outside.

The stator may include: a housing having a cylindrical shape; and housing caps in the center portion of which a portion of the rotor is inserted and which are axially combined with the housing.

The wire channel may be formed at a predetermined distance from an inner surface of the housing and formed axially through the housing.

The controller may be disposed at a side of the housing cap and may further include a positions sensor cap axially combined with the housing cap from the outside so that the controller is not exposed to the outside, the wire channels may be formed through the housing and the housing cap so that the wire connecting the valve on the housing or the position sensor to the controller is disposed through the wire channel, and the wire channel of the housing and the wire channel of the housing cap may communicate with each other, when the housing and the housing cap are combined.

A valve groove may be radially formed on the outer side of the housing and the valve may be disposed in the valve groove.

The housing may further include a stator vane therein that protrudes toward the center of the rotor, and the valve groove may be formed in the protrusion direction of the stator vane from the outer side of the stator.

The housing may have a sleeve in which a spool of the valve is inserted and slid and the valve groove may have an opening to communicate with the sleeve, and in detail, the sleeve may be formed axially through the stator vane, and the valve may be a flapper stage with a flapper and a nozzle in which the flapper may operate the spool through the opening.

The housing may comprise: a plurality of pressure sensor grooves where the pressure sensors are disposed; and a plurality of pressure measurement channels connecting the pressure sensor grooves and the cavities, in which the pressure sensors may be disposed in the pressure sensor grooves, respectively.

The pressure sensors may be two pressure sensors and may be axially formed from a side of the housing disposed at a predetermined distance from the cavities for receiving the hydraulic oil.

The stator may further include an input port and an output port that define channels for the hydraulic oil from the outside to the valve so that the hydraulic oil flows into/out of the valve through the stator.

The integrated hydraulic rotary actuator may further include: a connector that is disposed outside the stator to receive a reference value of the controller and power from the outside; and a wire that electrically connects the controller and the connector and is disposed through the wire cannels.

In another aspect, the present invention may provide a robot including: the integrated hydraulic rotary actuator; a central control unit that controls the hydraulic rotary actuator; and a link that is connected with the hydraulic rotary actuator and rotated by torque.

In the integrated hydraulic rotary actuator according to the present invention, a valve, a sensor, a controller, and a driving unit for controlling the rotary actuator are integrated, so wires connecting them are not exposed to the outside. Accordingly, it is possible to prevent damage due to interference in operation and maintenance is easy.

Further, since it is integrated, including a controller, when the actuator according to the present invention is used, connecting with other parts is easy and interference can be reduced. Therefore, it is easy to design and manufacture a resultant product.

DESCRIPTION OF EXEMPLARY EMBODIMENTS

Figure 1:
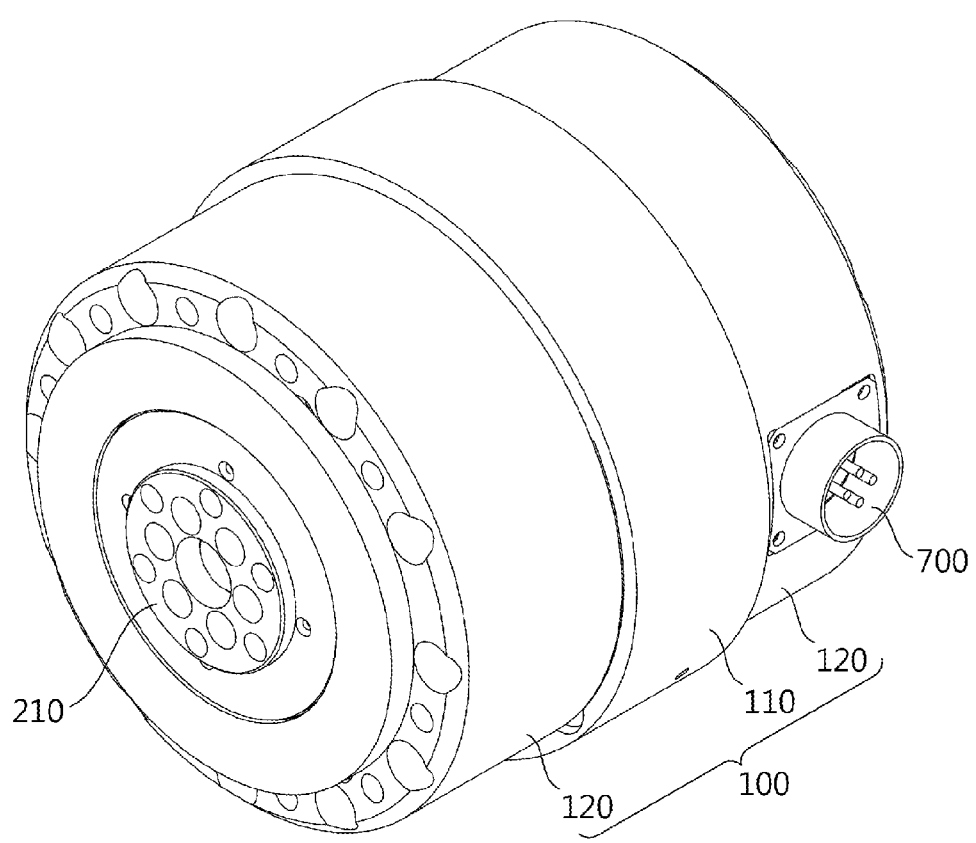
FIG. 1 is a perspective view of an embodiment according to the present invention.

Hereinafter, an integrated hydraulic rotary actuator according to an embodiment of the present invention is described in detail with reference to the accompanying drawings. The names of components used in the following description may be referred to as other names in this field. However, even if modified embodiments are selected, they may be considered as equivalent configurations, as long as there are functional similarity and identity. Further, the reference numerals of the components are provided for the convenience of description. However, those indicated by the reference numerals in the drawings do not limit the components to the range shown in the drawings. Similarly, even if embodiments obtained by modifying some of the configurations in the drawings are selected, they may be considered as equivalent configurations, as long as there are functional similarity and identity. Further, when components are recognized as components that should be included at the level of those skilled in the art, they are not described.

Figure 2:
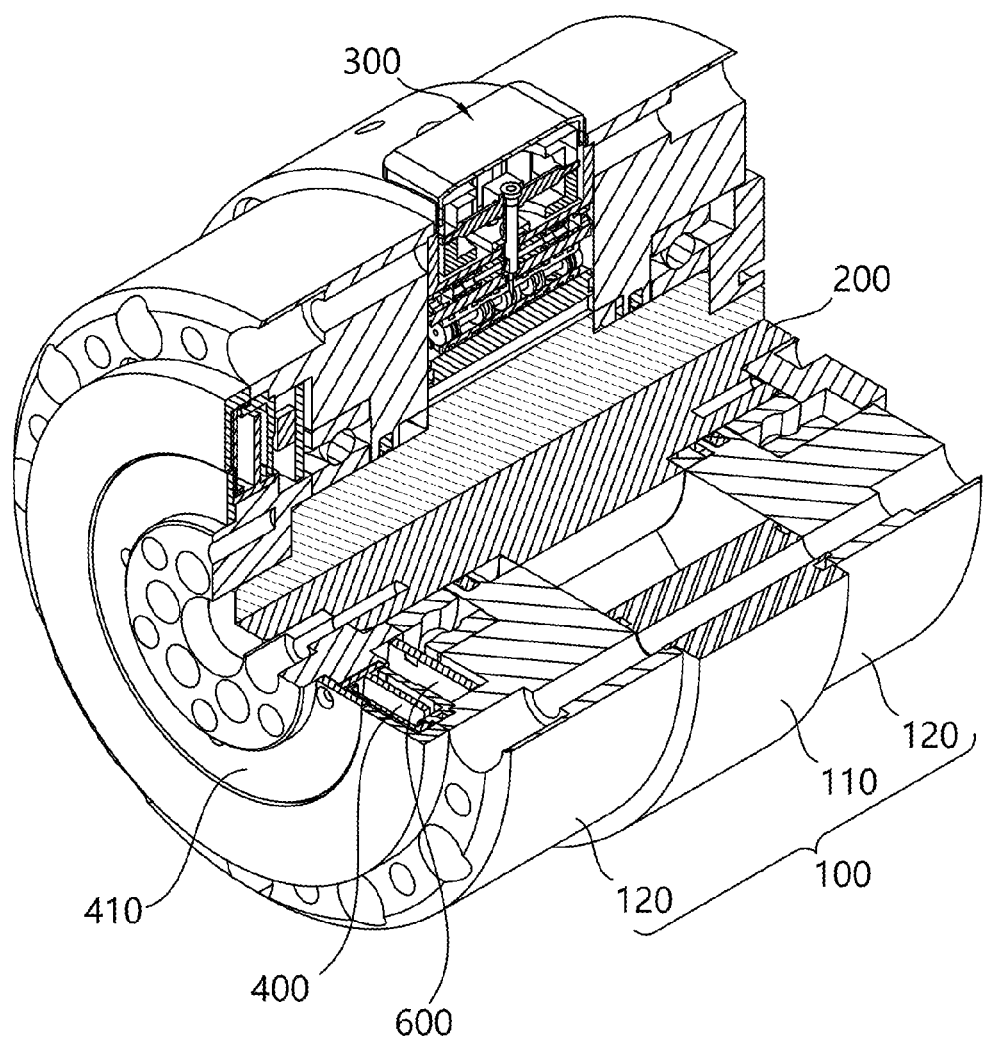
FIG. 2 is a partial cut view of the embodiment according to the present invention.
Figure 3:
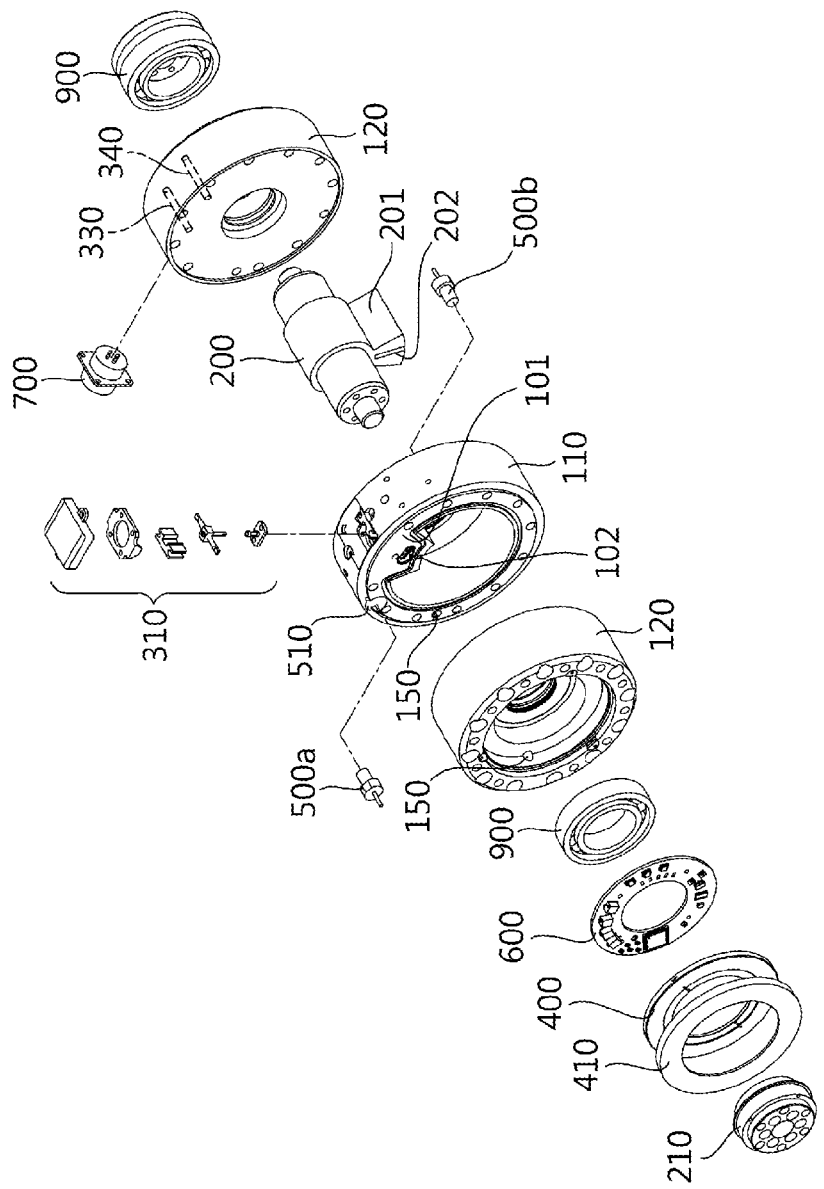
FIG. 3 is an exploded perspective view of the embodiment according to the present invention.
Figure 4:
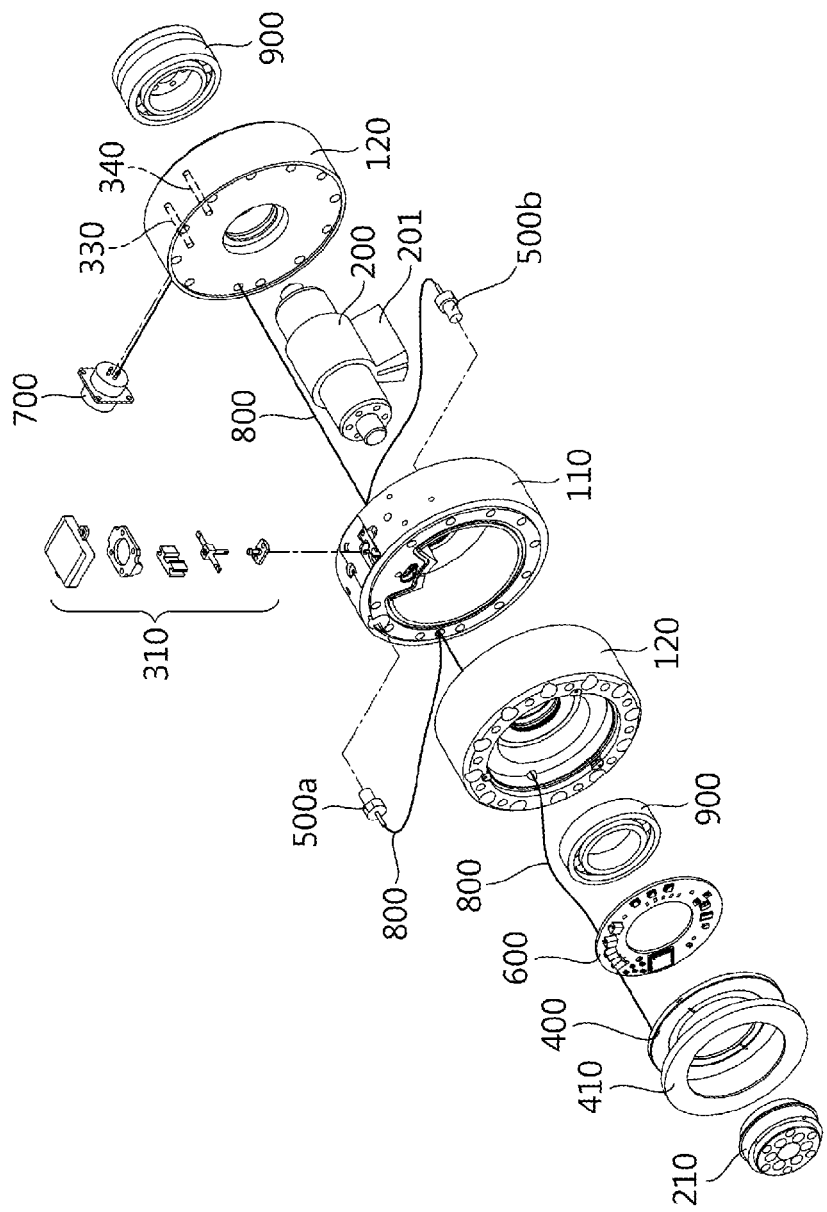
FIG. 4 is an exploded perspective view of the embodiment including a wire line.

FIG. 1 is a perspective view of an embodiment according to the present invention, FIG. 2 is a partial cut view of the embodiment according to the present invention, FIG. 3 is an exploded perspective view of the embodiment according to the present invention, and FIG. 4 is an exploded perspective view of the embodiment including a wire line.

As shown in the figures, a hydraulic rotary actuator according to an embodiment of the present invention may include a stator 100, a rotor 200, a position sensor 400, pressure sensors 500a and 500b, a controller 600, a connector 700, and bearings 900.

The stator 100 may be formed in the shape of a cylinder, making the entire external appearance of the hydraulic rotary actuator, and the rotor 200 may be rotatably inserted in the stator 100. The inner surface of the stator 100 defines a cavity for receiving hydraulic oil in cooperation with the outer side of the rotor 200.

The stator 100 may include a housing 110 making a cylindrical side and housing caps 120 coupled to both axial sides of the housing 100. The rotor 200 is axially inserted in the housing 110 and the housing caps 120 are coupled to both axial sides of the housing 110, thereby preventing the inserted rotor 200 from axially separating. Sealing members (not shown) may be disposed at the joints of the housing 110 and the housing caps 120 to prevent leakage of the hydraulic oil received inside. However, the housing 110 and the housing caps 120 are not limited to the shapes described above and may be modified in various configurations defining a cavity for receiving hydraulic oil inside.

On the other hand, corresponding to a rotor vane 201 on the rotor 200 to be described below, a stator vane 101 protruding toward the center of a rotational axis may be formed on the inner side of the stator 100. The side facing the center of the rotational axis of the stator vane 101 is in contact with the outer side of the rotor and the radial side of the rotor vane 201 is in contact with the inner side of the stator, so the cavity for receiving hydraulic oil is divided into two parts. The rotor is operated by a pressure difference of the hydraulic oil in the two cavities. That is, torque can be generated by the pressure difference of the hydraulic oil in the cavities at both sides in the rotational direction from the rotor vane 201. Meanwhile, as in the present embodiment, when it is a single-vane type, the driving angle may be large over 270 degrees. However, the numbers of the vanes are just examples, so two or more vanes may be provided and the actuator may be modified to operate with various torque and rotation angles by changing the shape, and the width etc., in accordance with operation purposes.

A rotor vane seal 102 and a stator vane seal 202 may be axially disposed at the ends of the stator vane 101 and the rotor vane 201, respectively. When hydraulic oil leaks between the cavities at both sides of the vanes 101 and 201, the efficiency of the rotor 200 reduces, so the seals are provided to prevent the leakage. A shaft seal (not shown) may be provided between the housing caps 120 and the rotor 200 to prevent axial leakage of hydraulic oil between the rotor 200 and the housing caps 120. The shapes of the vane seals 102 and 202 and the shaft seal (not shown) are just examples and may be changed in various ways and those seals are used in many fields, so they are no longer described in detail.

As described above, the stator 100 and the rotor 200 generate torque and are connected to external parts to rotate them relative to each other. For example, when the actuator is applied to a robot arm, the stator 100 and the rotor 200 function as a joint connecting two parts and may rotating two links relative to each other in order to rotate the robot arm. A connection groove for connection with a link is formed on the side of the stator 100 and a link connector block 210 for connection with another link is fastened to an axial end of the rotor 200. However, although the link connector block 210 is axially coupled to the rotor 200, it is just an example and the rotor 200 itself may be connected an external part.

The bearings 900, which resist an axial force at both axial ends of the rotor 200 for smooth rotation, may be axially inserted into the housing caps 120 from outside the housing caps 120.

As for the stator 100 again, a valve 300, a sensor unit, and the controller 600 are mounted on the stator 100 and an input port 300, and output port 340 are formed on the stator 100.

The valve 300 is provided to supply hydraulic oil to the cavities in the stator 100. The valve 300 may be a servo valve 300 and can change the supply direction of hydraulic oil in response to operation signals. An operation signal from a user or an external central control unit can be received by the controller 600 to be described below and the valve 300 can be operated in response to the operation signal. The operation principle of the valve 300 is widely applied, so it is no longer described.

The valve 300 may be disposed in the valve groove 160 on the housing 110. The valve groove 160 is formed on the outer side of the housing 110 to be concave toward the inside of the stator vane 101. The valve groove 160 may communicate with a passage, the input port 330, and the output port 340 that are connected to valve 300 and the cavities for receiving hydraulic oil in the housing 110. However, this configuration exemplifies and various types of servo valves such as a nozzle flapper type valve 300, a zet-nozzle and a DDV (Direct Drive Valve) can be applied. Further, the valve groove 160 and the valve 300 may be modified so that the entire or a portion of a servo valve can be disposed in the valve groove 160.

The input port 330 and the output port 340 make a passage for hydraulic oil from the outer side of the stator 100 to the valve 300 at the inside. The input port 330 provides a channel through which hydraulic oil flows inside from the outside and the output port 340 provides a channel through which hydraulic oil flows outside. The input port 330 and the output port 340 extend to the valve on the stator 100 through the stator 100.

The input port 330 and the output port 340 axially pass through the housing cap 120 at the rear portion in FIG. 3 and axially extend to the valve 300 through the housing 110. The shape and position of the input port 330 and the output port 340 may be variously changed.

Hydraulic oil flows into the stator 100 from the outside through the input port 330, moves to the valve 300, and is then selectively supplied to the cavities for receiving hydraulic oil in the stator 100 from the valve 300. In this process, hydraulic pressure is applied to the rotor vane 202, so the rotor 200 is rotated. Further, the hydraulic oil in the opposite cavity, in contrast, passes through the valve 300 and the flows out of the actuator through the output port 340. The configuration of the valve will be described below.

The sensor unit may include the position sensor 400 and the pressure sensors 500*a* and 500*b*. The position sensor 400 may measure the rotational position of the rotor 200 and the pressure sensors 500*a* and 500*b* may measure the pressure of hydraulic oil applied to the cavity for receiving hydraulic oil in the stator 100.

The position sensor 400 is axially fitted on the outer side of the housing cap 120 to cover a portion of the rotator 200 that protrudes out of the housing cap 120 and measures the rotational angle of the rotor 200. A groove corresponding to the shape of the position sensor 400 may be formed on the outer side of the housing cap 120 where the position sensor 400 is disposed to provide a cavity for holding the position sensor 400. The position sensor 400 may be formed in the shape of a flat ring to be seated in the groove. However, the shape of the position sensor 400 is just an example and may be changed in various ways.

A position sensor cap 410 may be disposed axially outside the housing cap 120. The position sensor cap 410 may be combined with the housing cap 120 so that a cavity is defined axially therein. The position sensor 400 and the controller 600 to be described below can be disposed in this cavity.

However, since the position sensor 400 is widely used, the configuration and the operation principle of the position sensor 400 are not described in detail.

The pressure sensor grooves 510 may be formed on both axial sides of the housing 110. The pressure sensor grooves 510 may be concave to correspond to the shape of the pressure sensors 500*a* and 500*b* to be described below. A side of each of the pressure sensor grooves 510 may communicate with the cavity for receiving hydraulic oil through passages.

The pressure sensors 500*a* and 500*b* can measure the pressure of the hydraulic oil in the cavity for receiving hydraulic oil. The pressure sensors 500*a* and 500*b* may be inserted in the pressure sensor grooves 510, respectively. The pressure sensors 500*a* and 500*b* can be fitted in the pressure sensor grooves 510 and measure the pressure of hydraulic oil in pressure measurement channels (not shown) formed from sides of the pressure sensor groove 510 to the cavity for receiving hydraulic oil.

However, the shape of the pressure sensor grooves 510 are just examples and the pressure sensor grooves 510 may be changed in various shapes so that the pressure sensors 500*a* and 500*b* can be inserted into the stator 100. Alternatively, the pressure sensors 500*a* and 500*b* may be disposed at various positions such as being disposed directly in the cavity for receiving hydraulic oil or being inserted radially in the stator 100.

The controller 600 is provided to receive a reference input value for rotating the rotor 200 from the outside and to rotate the rotor 200 at a desired angle by controlling the valve 300. In this configuration, it is possible to calculate a control input value for driving the valve 300 by feeding back the values measured by the positions sensor 400 and the pressure sensors 500*a* and 500*b*.

The controller 600 is disposed outside the stator 100, and may be disposed at a position where it covers the rotor 200 outside the housing cap 120. The controller 600 is disposed, together with the positions sensor 400, axially in the cavity between the housing cap 120 and the position sensor cap 410. Accordingly, it is not exposed to the outside by the positions sensor cap 410 and the housing cap 120. The controller 600 may be formed in the shape of a ring to be disposed in the cavity between the position sensor cap 410 and the housing cap 120. The position and the shape of the controller 600 may be modified in various ways as long as it is not exposed to the outside, not being limited to the shape and the position described above.

The controller 600 may generate a signal for driving the valve (300) in response to a reference input value to rotate the rotor 200 and may generate various input in accordance with external loads applied to the rotor 200. In detail, when the pressure is changed in the cavities for receiving hydraulic oil by an external force applied to the rotor 200 fixed at a position, it may perform compliance control, using pressure measured by the pressure sensors 500*a* and 500*b*. However, the function of the controller 600 is not limited to the compliance control and other various control methods for controlling the valve 300 by feeding back values measured by the sensor unit may be applied.

The connector 700 is radially disposed outside the stator 100, transmits a signal to the controller 600, and transmits power for driving the valve 300, the pressure sensors 500a and 500b, the position sensor 400, and the controller 600. The connector 700 is connected with a central control unit or a computer at the outside to receive reference input for driving the rotary actuator. The connector may be disposed at various positions on the outer side of the rotary actuator and the configuration of the connector 700 has been well known in the art, it is no longer described in detail.

Figure 5:
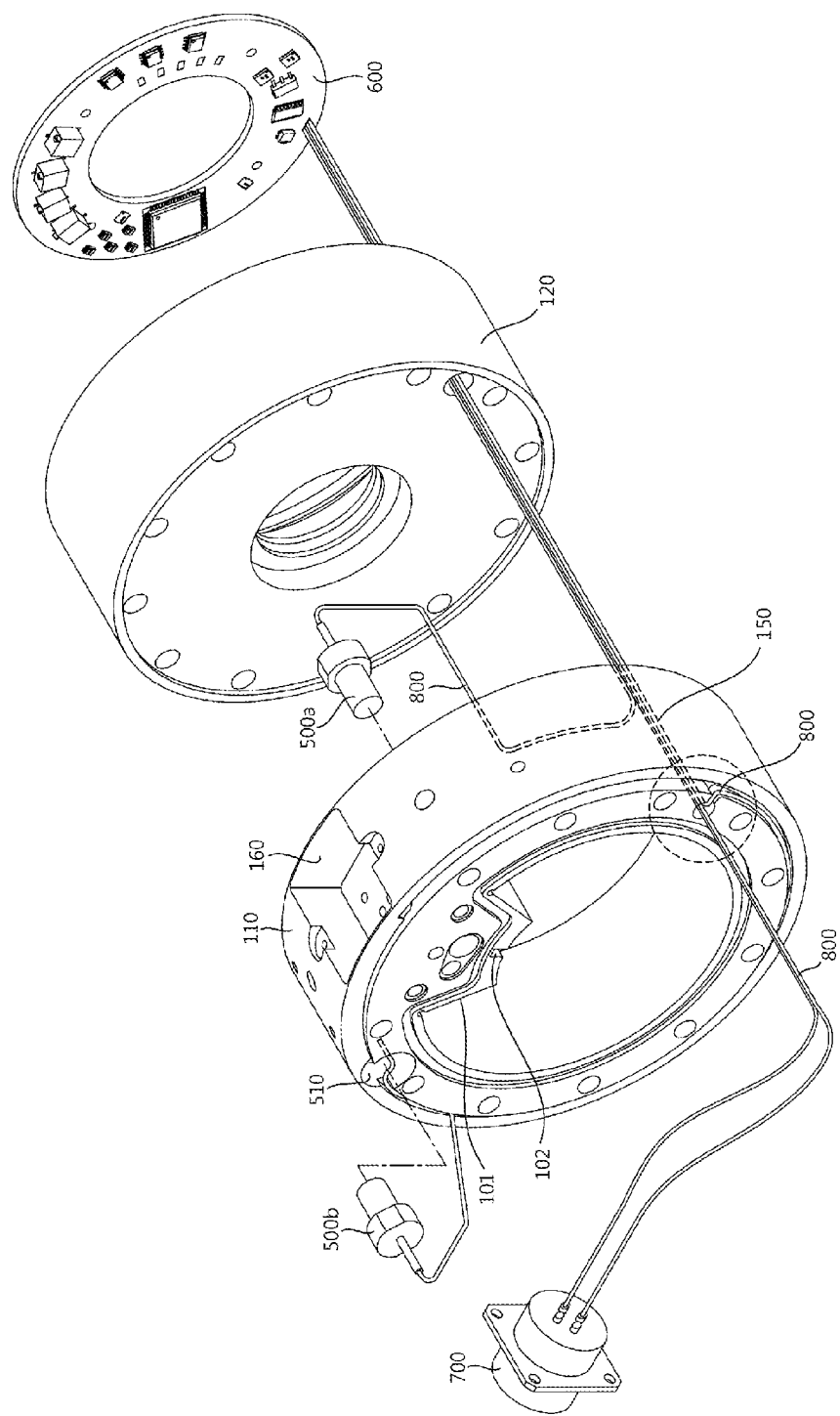
FIG. 5 is an enlarged perspective view of the wires and the wire channel of a stator of FIG. 3, seen from the rear side.
Figure 6:
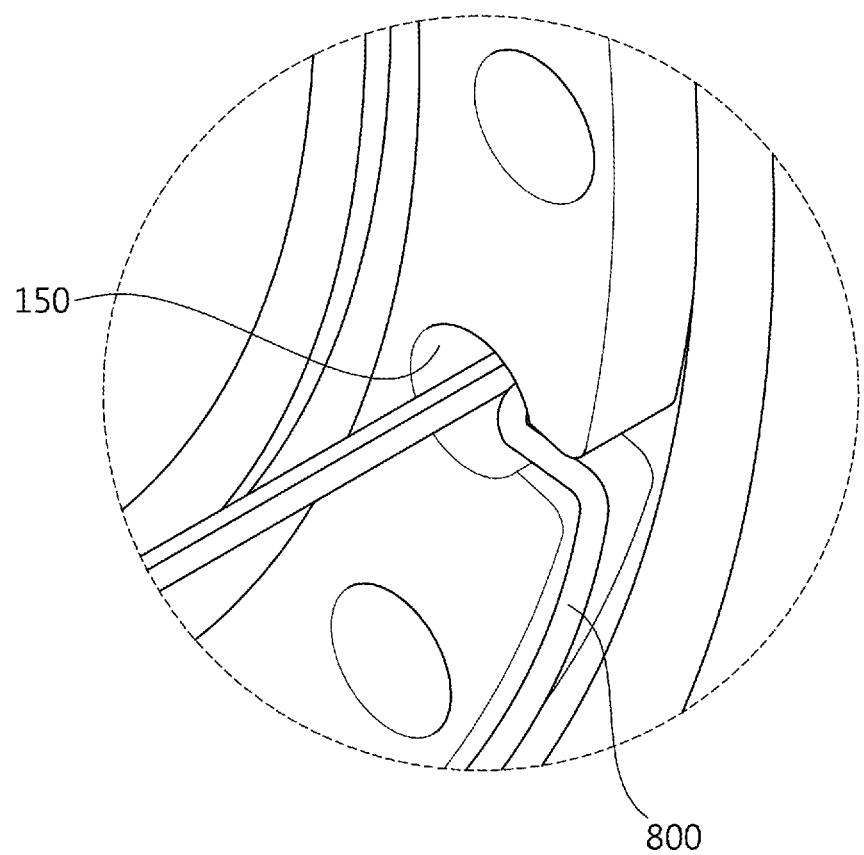
FIG. 6 is a partial enlarged view of the wire channel of FIG. 5.

Wires and a wire channel are described hereafter with reference to FIGS. 5 and 6.

FIG. 5 is an enlarged perspective view of the wires and the wire channel of a stator of FIG. 3, seen from the rear side and FIG. 6 is a partial enlarged view of a wire channel of FIG. 5.

As shown in the figures, wires 800 may connect the valve 300, the positions sensor 400, the pressure sensors 500a and 500b, and the connector 700 to the controller 600.

A wire channel 150 allows wires 800 connecting the components at both sides axially from the housing 110 to pass through the housing 110. The wire channel 150 is formed axially through the housing 110 and the housing cap 120. The wire channel 150 may be formed axially at a predetermined distance from the inner rotational surface of the housing 110 and the housing cap 120 with which hydraulic oil comes in contact, in order not to influence the cavities for receiving the hydraulic oil. Further, the wire channel 150 may be formed at an appropriate position in order not to interfere with the valve 300 on the housing 110 and the passages for the hydraulic oil.

Although the wire channel 150 is formed axially through the housing 110 in the figures, it may be formed at various angles and in various cross-sections, for example in the shape of a groove on the outer side across the housing 110 so that the wires 800 can be disposed. Further, it may be changed in various ways in accordance with the positions of the components that are electrically connected, such as the valve 300, the position sensor 400, and the pressure sensors 500a and 500b, and a plurality of wire channels may be provided.

The wires 800 may be disposed at a predetermined distance from the inner surface of the stator 100 that comes in contact with hydraulic oil to prevent the passages from the components to the wire channel 150 for arranging the wires 800 from influencing the cavities for receiving hydraulic oil.

Referring to FIG. 5 again, the wire 800 connected to the pressure sensor 500a closer to the controller 600 is arranged around the outer side of the housing 110 and connected to the controller 600 through the wire channel 150 formed through the housing cap 120. On the other hand, the wire 800 connected to the pressure sensor 500b at the opposite side is arranged around the outer side of the housing 110 and passes through the wire channel 150 of the housing 110 and is then connected to the controller 600 through the wire channel 150 of the housing cap 120. When the wires 800 are arranged, as described above, they cannot be exposed to the outside and cannot influence to the cavities for receiving hydraulic oil.

The arrangement of the wires 800 connecting the pressure sensors 500a and 500b to the controller 600, respectively, is just an example and may be changed in various ways. For example, when the pressure sensors 500a and 500b are disposed at other positions, as described above, that is, when the pressure sensors 500a and 500b are both disposed on the side of the housing 100 closer to the controller 600, the wires connecting the pressure sensors 500a and 500b to the controller 600 may not pass through the wire channel 150 of the housing 110 but the wire channel of the housing cap 120. Further, when the position sensor 400 and the controller 600 are disposed on a side of the housing cap 120, they may be connected not through the wire channel 150.

A wire 800 receiving reference input by connecting the controller 600 and the connector 700 may be disposed with other wires 800 through the wire channels 150. Power may be supplied to at least one of the controller 600, the position sensor 400, the pressure sensor 500a, 500b and the valve 300 through the wires 800 disposed from the connector 700 through the wire channels 150.

The wire 800 connecting the controller 600 and the valve 300 may also be disposed through a wire channel 150.

As described above, since the wires 800 can be disposed through the wire channels 150 formed in the stator 100, the wires 800 are not exposed to the outside.

Figure 7:
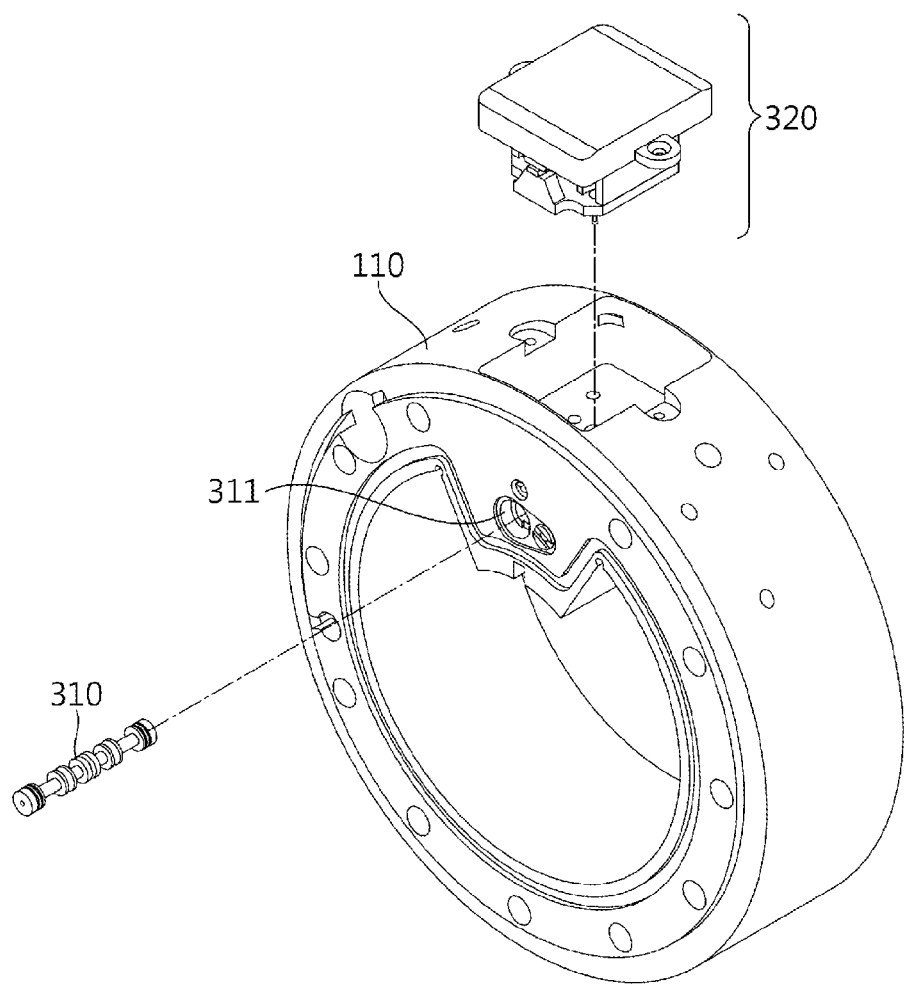
FIG. 7 is an enlarged perspective view showing a valve groove of a second embodiment of the present invention.

FIG. 7 is an enlarged perspective view showing a valve groove of a second embodiment of the present invention.

As shown in the figure, a valve groove 160 may be formed on a side of the housing 110 and a sleeve 311 allowing a spool 310 of the valve 300 to slide may be formed on a side of the housing 110 which close to the valve groove 160.

That is, a spool stage of the valve 300 is integrated with the housing 110 and a flapper stage 320 is disposed in the valve groove 160, thereby completing the valve 300. Hydraulic lines A and B that communicate with the cavities for receiving hydraulic oil communicate with the sleeve 311 and may communicate with the input port 330 and the output port 340 that are passages for hydraulic oil flowing inside/outside. When a hydraulic rotary actuator having this configuration is formed in a small size, it is possible to solve the problem of a small valve space by forming some of the structure of the valve 300 at the housing 110.

What is claimed is:

1. An integrated hydraulic rotary actuator comprising:
a stator having a space therein;
a rotor inserted in the stator;
a valve disposed at a side of the stator and changing a direction of hydraulic oil supplied to cavities to rotate the rotor, the cavities being defined by an inner surface of the stator and an outer surface of the rotor;
at least one sensor unit measuring a state of the hydraulic oil in the cavities or a state of the rotor;
a controller disposed at a side of the stator and generating a control input for controlling the valve on the basis of a reference value inputted from outside of the actuator and a value measured by the sensor unit; and
wires electrically connecting the controller with the valve and electrically connecting the controller with the sensor unit, the wires being disposed inside the stator and invisible from the outside,
wherein the stator includes a plurality of pressure sensor grooves in which a plurality of pressure sensors are respectively disposed, and a plurality of pressure measurement channels connecting the pressure sensor grooves and the cavities.

2. The integrated hydraulic rotary actuator of claim 1, wherein the stator further includes a wire channel in which at least one of the wires is disposed.

3. The integrated hydraulic rotary actuator of claim 2, wherein the wire channel is formed at a predetermined distance from the inner surface of the stator.

4. The integrated hydraulic rotary actuator of claim 3, wherein the sensor unit includes the plurality of pressure sensors measuring pressures in the cavities receiving the hydraulic oil, respectively.

5. The integrated hydraulic rotary actuator of claim 3, wherein the sensor unit includes a position sensor measuring a rotational position of the rotor.

6. The integrated hydraulic rotary actuator of claim 5,
wherein the position sensor is disposed axially on an outer side of the stator, close to the rotor, and
wherein the actuator further includes a position sensor cap axially combined with the stator from the outside.

7. The integrated hydraulic rotary actuator of claim 6, wherein the controller is disposed axially on the outer side of the stator, close to the rotor and positioned between the position sensor cap and the stator.

8. The integrated hydraulic rotary actuator of claim 3, wherein the stator further includes:
a housing having a cylindrical shape; and
first and second housing caps each having a center portion into which a portion of the rotor is inserted, the first and second housing caps being axially combined with the housing.

9. The integrated hydraulic rotary actuator of claim 8, wherein the wire channel is formed at a predetermined distance from the inner surface of the housing and formed axially through the housing.

10. The integrated hydraulic rotary actuator of claim 9, wherein the controller is disposed at a side of the first housing cap and the actuator further includes a position sensor measuring a rotational position of the rotor and a position sensor cap axially combined with the first housing cap,
wherein a first portion of the wire channel is formed through the housing and a second portion of the wire channel is formed through the first housing cap, the wires including a first wire and a second wire, one or both of the first wire connecting the valve on the housing to the controller and the second wire connecting the position sensor to the controller being disposed within the wire channel, and
wherein the first portion of the wire channel of the housing and the second portion of the wire channel of the first housing cap communicate with each other, when the housing and the first housing cap are combined.

11. An integrated hydraulic rotary actuator comprising:
a stator having a space therein and including a housing;
a rotor inserted in the stator;
a valve disposed at a side of the stator and changing a direction of hydraulic oil supplied to cavities to rotate the rotor, the cavities being defined by an inner surface of the stator and an outer surface of the rotor;
at least one sensor unit measuring a state of the hydraulic oil in the cavities or a state of the rotor;
a controller disposed at a side of the stator and generating a control input for controlling the valve on the basis of a reference value inputted from outside of the actuator and a value measured by the sensor unit; and
wires electrically connecting the controller with the valve and electrically connecting the controller with the sensor unit, the wires being disposed inside the stator and invisible from the outside,
wherein a valve groove is radially formed on an outer side of the housing and the valve is disposed in the valve groove.

12. The integrated hydraulic rotary actuator of claim 11,
wherein the housing further includes a stator vane that protrudes in a direction toward a center of the rotor, and
wherein the valve groove is formed in the protrusion direction of the stator vane.

13. The integrated hydraulic rotary actuator of claim 12, wherein the housing further includes a sleeve in which a spool of the valve is inserted and slid, and the valve groove has an opening to communicate with the sleeve.

14. The integrated hydraulic rotary actuator of claim 13, wherein the sleeve is formed axially through the stator vane of the housing, and
wherein the valve is a flapper stage with a flapper and a nozzle and the flapper operates the spool through the opening.

15. The integrated hydraulic rotary actuator of claim 11, wherein the housing comprising:
a plurality of pressure sensor grooves where a plurality of pressure sensors are disposed; and
a plurality of pressure measurement channels connecting the pressure sensor grooves and the cavities, and
wherein the pressure sensors are disposed in the pressure sensor grooves, respectively.

16. The integrated hydraulic rotary actuator of claim 15, wherein the pressure sensor grooves are two pressure sensor grooves and are axially formed from a side of the housing disposed at a predetermined distance from the cavities for receiving the hydraulic oil.

17. The integrated hydraulic rotary actuator of claim 11, wherein the stator further includes an input port and an output port that define channels through which the hydraulic oil flows between the outside and the valve.

18. The integrated hydraulic rotary actuator of claim of claim 3, further comprising:
a connector that is disposed outside the stator to receive the reference value of the controller and power from the outside; and
a wire that electrically connects the controller and the connector and is disposed through the wire channel.

19. A robot comprising:
a hydraulic rotary actuator;
a central control unit that controls the hydraulic rotary actuator; and
a link that is connected with the hydraulic rotary actuator and rotated by torque,
wherein the hydraulic rotary actuator includes:
a stator having a space therein;
a rotor inserted in the stator;
a valve that is disposed at a side of the stator and changing a direction of hydraulic oil supplied to cavities to rotate the rotor, the cavities being defined by an inner surface of the stator and an outer surface of the rotor;
at least one sensor unit measuring a state of the hydraulic oil in the cavities or a state of the rotor;
a controller disposed at a side of the stator and generating a control input for controlling the value on the basis of a reference value inputted from outside of the actuator and a value measured by the sensor unit; and
wires electrically connecting the controller with the valve and electrically connecting the controller with the sensor unit, the wires being disposed inside the stator and invisible from the outside,
wherein the stator includes a plurality of pressure sensor grooves in which a plurality of pressure sensors are respectively disposed, and a plurality of pressure measurement channels connecting the pressure sensor grooves and the cavities.

\* \* \* \* \*